US012675826B2

(12) United States Patent
Kelly et al.

(10) Patent No.: US 12,675,826 B2
(45) Date of Patent: Jul. 7, 2026

(54) SERVER DEVICE FOR PROVIDING MULTIPLE HEALTH INSURANCE CONTRIBUTION AMOUNTS IN SAME USER INTERFACE

(71) Applicant: Nexben, Inc., Minneapolis, MN (US)

(72) Inventors: John Kelly, Minneapolis, MN (US); Mark Pontliana, Minneapolis, MN (US)

(73) Assignee: NEXBEN, INC., Minneapolis, MN (US)

( * ) Notice: Subject to any disclaimer, the term of this patent is extended or adjusted under 35 U.S.C. 154(b) by 18 days.

(21) Appl. No.: 18/570,817

(22) PCT Filed: Jun. 16, 2021

(86) PCT No.: PCT/US2021/037685
§ 371 (c)(1),
(2) Date: Dec. 15, 2023

(87) PCT Pub. No.: WO2022/265631
PCT Pub. Date: Dec. 22, 2022

(65) Prior Publication Data
US 2024/0281893 A1      Aug. 22, 2024

(51) Int. Cl.
G06Q 40/08          (2012.01)
(52) U.S. Cl.
CPC ................................... G06Q 40/08 (2013.01)
(58) Field of Classification Search
CPC .................................................... G06Q 40/08
USPC .......................................................... 705/4
See application file for complete search history.

(56) References Cited

U.S. PATENT DOCUMENTS

| | | | | |
|---|---|---|---|---|
| 7,729,984 | B1 * | 6/2010 | Nappi | G06Q 20/10 |
| | | | | 705/35 |
| 8,615,711 | B2 * | 12/2013 | Lauridsen | G06F 16/958 |
| | | | | 709/224 |
| 9,537,929 | B2 * | 1/2017 | Lauridsen | G06F 16/958 |
| 2002/0198831 | A1 * | 12/2002 | Patricelli | G06Q 30/04 |
| | | | | 705/40 |

(Continued)

OTHER PUBLICATIONS

International Searching Authority, "International Search Report and Written Opinion" from Application No. PCT/US2021/037685, Mailed Feb. 18, 2022, pp. 1-9.

*Primary Examiner* — Hai Tran
(74) *Attorney, Agent, or Firm* — Fredrikson & Byron, P.A.

(57) ABSTRACT

A server device configured to provide subsidy information to a client is described. The server device receives, from an employee computing device, employee information for a first employee of an employer. The server device determines, based on the employee information and employer subsidy information provided, an employer contribution to a first set of one or more healthcare plans for the first employee. The server device determines, based on the employee information, a secondary subsidy provided by a secondary entity through a secondary health insurance marketplace for a second set of one or more healthcare plans. The server device generates a graphical user interface that includes each of a graphical indication of the employer contribution and a graphical indication of the secondary subsidy. The server device outputs, for display on a display device operatively connected to the employee computing device, the graphical user interface.

20 Claims, 5 Drawing Sheets

(56) References Cited

U.S. PATENT DOCUMENTS

| | | | | |
|---|---|---|---|---|
| 2004/0243928 | A1* | 12/2004 | Hesmer | G06F 16/958 |
| | | | | 707/E17.116 |
| 2007/0027716 | A1* | 2/2007 | Pembroke | G06Q 40/02 |
| | | | | 705/37 |
| 2007/0055942 | A1* | 3/2007 | Hesmer | G06F 16/958 |
| | | | | 707/E17.116 |
| 2009/0055224 | A1* | 2/2009 | Kashyap | G06Q 40/08 |
| | | | | 705/4 |
| 2010/0094663 | A1* | 4/2010 | Spriggs | G06Q 10/1057 |
| | | | | 705/322 |
| 2013/0268836 | A1* | 10/2013 | Barak | G06F 16/954 |
| | | | | 715/234 |
| 2015/0254754 | A1* | 9/2015 | Lang | G06Q 40/08 |
| | | | | 705/4 |
| 2016/0078543 | A1* | 3/2016 | Dziuba | G06Q 10/067 |
| | | | | 705/4 |
| 2016/0092990 | A1* | 3/2016 | Dziuba | G06Q 40/08 |
| | | | | 705/4 |
| 2016/0125362 | A1* | 5/2016 | Dziuba | G06Q 10/1057 |
| | | | | 705/322 |
| 2017/0083673 | A1* | 3/2017 | Dawson, III | G16H 10/60 |
| 2017/0178135 | A1* | 6/2017 | Bull | G06Q 20/40 |
| 2018/0018647 | A1* | 1/2018 | Fredman | G06Q 50/22 |

* cited by examiner

1

SERVER DEVICE FOR PROVIDING MULTIPLE HEALTH INSURANCE CONTRIBUTION AMOUNTS IN SAME USER INTERFACE

This application is a 35 U.S.C. 371 national phase filing from International Application No. PCT/US2021/037685, filed Jun. 16, 2021. The entire contents of this application is incorporated herein by reference.

TECHNICAL FIELD

This disclosure relates to generating improved user interfaces for an application.

BACKGROUND

When using shopping for a health insurance plan, an employee can opt to use employer funds as a subsidy for their employer-provided health insurance plan. However, with the recent introduction of the Affordable Care Act's (ACA) health insurance marketplace, some employees opt to use a federally-provided health insurance plan with a federal subsidy. The process for shopping for these plans is a time-consuming and data entry heavy that includes numerous user inputs and navigation to several different web pages.

For instance, an employee must enter their information into their employer portal (or must have it provided to the system by human resources in the same overall data entry process). The employee can shop for health insurance plans through their employer, determine the final cost if they were to apply the employee subsidy to the health insurance plan, and actively decide whether to accept that health insurance plan. If they wish to shop at the ACA's health insurance marketplace, they must actively decline the employer health insurance plan, navigate to the ACA website, enter all of the data from their employee portal a second time (and must do so accurately), receive the available plans, and then individually calculate the total out-of-pocket cost based on the subsidy provided by the government. If the user decides the employer provided plan is better, they must then navigate back to the employer portal, before the open enrollment period ends, and accept the health insurance plan. This means the user must ultimately do the entire data entry and mathematical process at least twice. This also means that user input tools for the employee's computing device receive twice as many inputs, twice as many navigations are sent over the network, and additional user inputs are required to perform the math necessary to receive the final costs.

SUMMARY

In general, the techniques of this disclosure provide a solution by using a single page from an employee page to provide both an employer contribution and an accurate, available government subsidy for a health insurance plan for the employee. With the information entered into the employee portal, including personal health information, dependent information, and salary information, a server device will automatically provide the employer contribution to a health insurance plan for the employee on a webpage within the portal. On that same page, the server device will also provide an accurate government subsidy available for the employee. The server device accomplishes this by taking the information already available to the server device within the portal and automatically populating the ACA health insurance marketplace with that information from the portal. The server device is able to generate an accurate number for the available government subsidy and provide both the potential government subsidy and the potential employer contribution on a same webpage without requiring the employee to actively decline the employer's offer, which would put the employee at risk for losing health insurance during the open enrollment period. From this point, the employee can select which offer they could like to take and be taken immediately to the necessary page within the portal or with the ACA's health insurance marketplace to complete the process.

This solution will reduce the strain on the systems overall by 50%. Rather than entering the same data twice, pinging between pages and navigating to multiple pages on different servers twice, and having to compare information across different websites to form a final evaluation, the techniques described herein remove this duplicative process by using the same information already provided to the system to automatically populate the actual system used by the government to calculate an available government subsidy. This removes the chances for user error when re-entering the data on the ACA health insurance marketplace, as well as decreasing the physical strain on user input tools in re-entering this information. Additionally, the user's computing device and network, which typically have less power than the larger systems available to server devices, experience less strain resulting from processing different web pages and communicating with different servers to navigate to different web pages within the overall host site. Additionally, this improved user interface provides a single webpage with all of the information needed for the employee to make an informed decision about their health insurance coverage, as opposed to the current systems that require comparing this information across different interfaces on different websites in different web browsers.

In one example, the disclosure is directed to a method that includes receiving, by a server device and from an employee computing device, employee information for a first employee of an employer. The method further includes determining, by the server device, and based on the employee information and employer subsidy information provided by the employer, an employer contribution to a first set of one or more healthcare plans for the first employee, the first set of one or more healthcare plans being provided by the employer. The method also includes determining, by the server device, and based on the employee information, a secondary subsidy provided by a secondary entity through a secondary health insurance marketplace for a second set of one or more healthcare plans for the first employee. The method further includes generating, by the server device, a graphical user interface that includes each of a graphical indication of the employer contribution and a graphical indication of the secondary subsidy. The method also includes outputting, by the server device, and for display on a display device operatively connected to the employee computing device, the graphical user interface.

In another example, the disclosure is directed to a server device comprising one or more communication units and one or more processors. The server device is configured to receive, from an employee computing device, employee information for a first employee of an employer. The server device is further configured to determine, based on the employee information and employer subsidy information provided by the employer, an employer contribution to a first set of one or more healthcare plans for the first employee, the first set of one or more healthcare plans being provided by the employer. The server device is also configured to determine, based on the employee information, a secondary subsidy provided by a secondary entity through a secondary health insurance marketplace for a second set of one or more healthcare plans for the first employee. The server device is further configured to generate a graphical user interface that includes each of a graphical indication of the employer contribution and a graphical indication of the secondary subsidy. The server device is also configured to output, for display on a display device operatively connected to the employee computing device, the graphical user interface.

In another example, the disclosure is directed to a non-transitory computer-readable storage medium containing instructions. The instructions, when executed, cause one or more processors to receive, from an employee computing device, employee information for a first employee of an employer. The instructions further cause the one or more processors to determine, based on the employee information and employer subsidy information provided by the employer, an employer contribution to a first set of one or more healthcare plans for the first employee, the first set of one or more healthcare plans being provided by the employer. The instructions also cause the one or more processors to determine, based on the employee information, a secondary subsidy provided by a secondary entity through a secondary health insurance marketplace for a second set of one or more healthcare plans for the first employee. The instructions further cause the one or more processors to generate a graphical user interface that includes each of a graphical indication of the employer contribution and a graphical indication of the secondary subsidy. The instructions also cause the one or more processors to output, for display on a display device operatively connected to the employee computing device, the graphical user interface.

In another example, the disclosure is directed to a method for performing any of the techniques described herein.

In another example, the disclosure is directed to a device configured to perform any of the techniques described herein.

In another example, the disclosure is directed to an apparatus comprising means for performing any of the techniques described herein.

In another example, the disclosure is directed to a non-transitory computer-readable storage medium having stored thereon instructions that, when executed, cause one or more processors of a computing device to perform the techniques described herein.

In another example, the disclosure is directed to a system comprising one or more computing devices configured to perform any of the techniques described herein.

In another example, the disclosure is directed to any of the techniques described herein.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
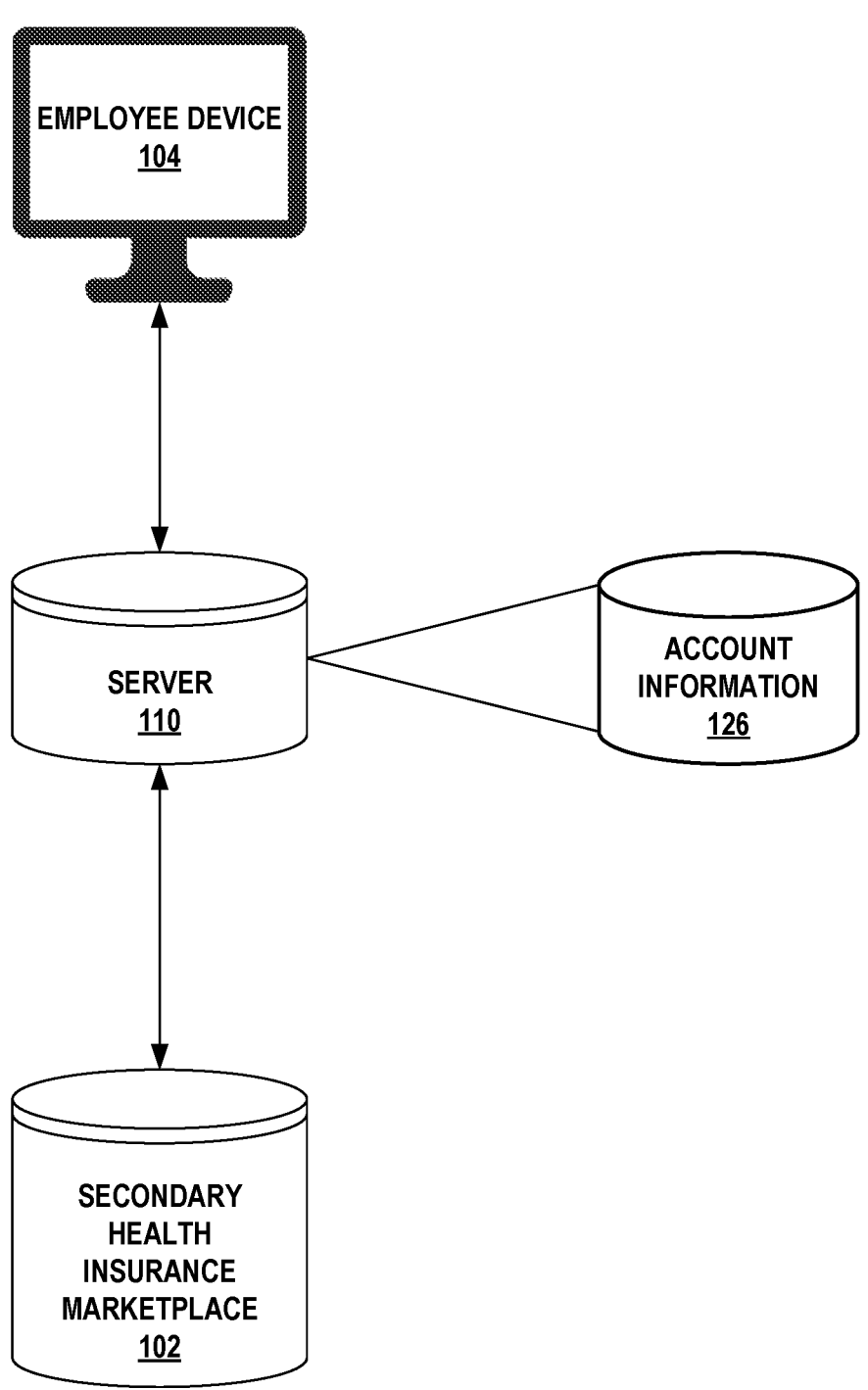
FIG. 1 is a block diagram illustrating an environment in which a server generates contribution amounts from different sources and presents those amounts in a same user interface, in accordance with one or more of the techniques described herein.

FIG. 1 is a block diagram illustrating an environment in which a server generates contribution amounts from different sources and presents those amounts in a same user interface, in accordance with one or more of the techniques described herein. FIG. 1 includes employee device 104, which can be any computing device where a user can access a web application, portal application, or web page provided by server 110, including a mobile computing device (e.g., a smartphone, a tablet computer, a laptop computer, etc.), a desktop computer, a smarthome component (e.g., a computerized appliance, a home security system, a wearable computing device (e.g., a smart watch, computerized glasses, smart headphones, etc.), a virtual reality/augmented reality/extended reality (VR/AR/XR) system, or a video game or streaming system, among other things.

FIG. 1 also includes server 110. Server 110 may be configured to communicate with employee device 104 over a wired or wireless connection, such as an Internet connection, a cellular connection, a radio connection, or any other connection suitable for transmitting data. Server 110 may be any computer with the processing power required to adequately execute the techniques described herein. For instance, server device 210 may be any one or more of a server system, a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, smart headphones, etc.), a virtual reality/augmented reality/extended reality (VR/AR/XR) system, a video game or streaming system, a network modem, router, or any other computerized device that may be configured to perform the techniques described herein. Server 110 may store account information 126 either locally or remotely on another device accessible by server 110.

Secondary health insurance marketplace 102 may be an additional server or computing device that may host a tool for calculating a potential subsidy if health insurance were to be purchased through secondary health insurance marketplace 102. In a typical use case, a user operating employee device 104 would have to navigate a web browser to a portal hosted by server 110, explicitly decline healthcare coverage through the user's employer, navigate the web browser subsequently to the tool hosted by secondary health insurance marketplace 102, manually enter what the user believes to be their accurate information into employee device 104, submit that information through employee device 104 to secondary health insurance marketplace, obtain an estimate with an accuracy dependent on the user's accurate recollection of their employment information, compare the estimate to what the user remembers regarding their employer contribution, and then decide whether to continue the process of signing up for the plan provided by secondary health insurance marketplace 102 or to navigate the web browser back to the portal application hosted by server 110 to opt back in to the employer health insurance plan and continue the process with server 110.

In accordance with the techniques described herein, server 110 receives, from employee device 104, employee information for a first employee of an employer to be stored in account information 126. Server 110 determines, based on the employee information and employer subsidy information provided by the employer, an employer contribution to a first set of one or more healthcare plans for the first employee, the first set of one or more healthcare plans being provided by the employer. Server 110 determines, based on the employee information, a secondary subsidy provided by a secondary entity through secondary health insurance marketplace 102 for a second set of one or more healthcare plans for the first employee. Server 110 generates a graphical user interface that includes each of a graphical indication of the employer contribution and a graphical indication of the secondary subsidy. Server 110 outputs, for display on a display device operatively connected to employee device 104, the graphical user interface.

By performing these techniques, server 110 improves the efficiency and operability of the overall system. Servers, such as server 110, tend to have higher processing power than user devices, such as employee device 104. As such, by requiring employee device 104 to only navigate to the portal application hosted by server 110 and allowing server 110 to take the employee information and automatically calculate the secondary subsidy using secondary health insurance marketplace 102, a much smaller percentage of the overall processing power is used by server 110 than would be required to perform a similar process by employee device 104. This also improves a network on which employee device 104 operates by reducing the network traffic required to navigate to multiple websites hosted by different servers, potentially multiple times. Furthermore, by reducing the amount of user inputs into employee device 104 due to server 110 being able to use same account information 126 for both calculations without requiring additional user input, the longevity, power consumption, battery life, and the lifespan of various physical input components of employee device 104 are all improved. As such, the techniques of this disclosure are integrated into a practical application by improving the environment through which the techniques are implanted. The techniques also provide an improved user interface by combining information from multiple sources into a single user interface, reducing the need to navigate through multiple other web pages to obtain potentially less reliable information. Furthermore, the techniques of this disclosure are integrated into a practical application by not monopolizing all webpage navigation or content gathering techniques, but instead containing the techniques to health insurance shopping.

Figure 2:
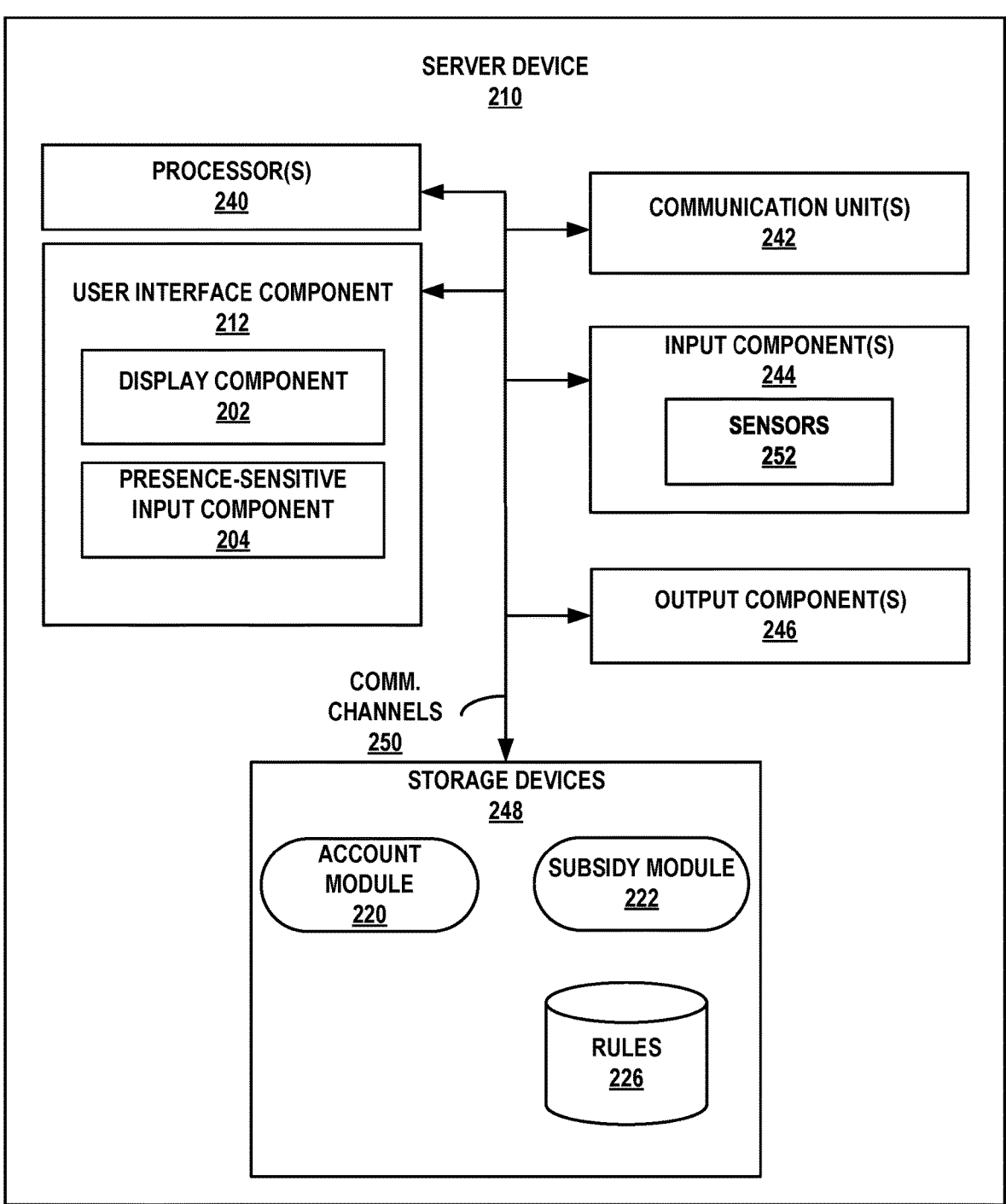
FIG. 2 is a block diagram illustrating a more detailed example of a computing device configured to perform the techniques described herein.

FIG. 2 is a block diagram illustrating a more detailed example of a computing device configured to perform the techniques described herein. Server device 210 of FIG. 2 is described below as an example of computing device 110 of FIG. 1. FIG. 2 illustrates only one particular example of server device 210, and many other examples of server device 210 may be used in other instances and may include a subset of the components included in example server device 210 or may include additional components not shown in FIG. 2.

Server device 210 may be any computer with the processing power required to adequately execute the techniques described herein. For instance, server device 210 may be any one or more of a server system, a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, smart headphones, etc.), a virtual reality/augmented reality/extended reality (VR/AR/XR) system, a video game or streaming system, a network modem, router, or any other computerized device that may be configured to perform the techniques described herein.

As shown in the example of FIG. 2, server device 210 includes user interface component (UIC) 212, one or more processors 240, one or more communication units 242, one or more input components 244, one or more output components 246, and one or more storage components 248. UIC 212 includes display component 202 and presence-sensitive input component 204. Storage components 248 of server device 210 include account module 220, subsidy module 222, and rules data store 226.

One or more processors 240 may implement functionality and/or execute instructions associated with server device 210 to dynamically calculate each of an employer contribution to a healthcare plan and a secondary subsidy for a healthcare plan. That is, processors 240 may implement functionality and/or execute instructions associated with server device 210 to take employee information stored in rules data store and calculate an expected contribution amount from an employer and an expected subsidy from a secondary source and present each amount in a same graphical user interface.

Examples of processors 240 include application processors, display controllers, auxiliary processors, one or more sensor hubs, and any other hardware configure to function as a processor, a processing unit, or a processing device. Modules 220 and 222 may be operable by processors 240 to perform various actions, operations, or functions of server device 210. For example, processors 240 of server device 210 may retrieve and execute instructions stored by storage components 248 that cause processors 240 to perform the operations described with respect to modules 220 and 222. The instructions, when executed by processors 240, may cause server device 210 to create a graphical user interface that includes each of an employer contribution and a secondary subsidy to an employee's healthcare plan.

Account module 220 may execute locally (e.g., at processors 240) to provide functions associated with managing an employee's health insurance-specific information and generating user interfaces in a portal application for the employee. In some examples, account module 220 may act as an interface to a remote service accessible to server device 210. For example, account module 220 may be an interface or application programming interface (API) to a remote server that stores the employee information or generates the user interfaces that contain the employer contribution and subsidy information amounts.

In some examples, subsidy module 222 may execute locally (e.g., at processors 240) to calculate each of an employer contribution to a healthcare plan and a secondary subsidy from a secondary entity to a healthcare plan. In some examples, subsidy module 222 may act as an interface to a remote service accessible to server device 210. For example, subsidy module 222 may be an interface or application programming interface (API) to a remote server that performs the calculations for the employer contribution and/or the secondary subsidy based on the employee information stored in rules data store 226.

One or more storage components 248 within server device 210 may store information for processing during operation of server device 210 (e.g., server device 210 may store data accessed by modules 220 and 222 during execution at server device 210). In some examples, storage component 248 is a temporary memory, meaning that a primary purpose of storage component 248 is not long-term storage. Storage components 248 on server device 210 may be configured for short-term storage of information as volatile memory and therefore not retain stored contents if powered off Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220 and 222, and data store 226. Storage components 248 may include a memory configured to store data or other information associated with modules 220 and 222, and data store 226.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of server device 210 may communicate with external devices via one or more wired and/or wireless networks by transmitting and/or receiving network signals on one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of server device 210 may receive input. Examples of input are tactile, audio, and video input. Input components 244 of server device 210, in one example, includes a presence-sensitive input device (e.g., a touch sensitive screen, a PSD), mouse, keyboard, voice responsive system, camera, microphone or any other type of device for detecting input from a human or machine. In some examples, input components 244 may include one or more sensor components (e.g., sensors 252). Sensors 252 may include one or more biometric sensors (e.g., fingerprint sensors, retina scanners, vocal input sensors/microphones, facial recognition sensors, cameras) one or more location sensors (e.g., GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, or a step counter sensor.

One or more output components 246 of server device 210 may generate output in a selected modality. Examples of modalities may include a tactile notification, audible notification, visual notification, machine generated voice notification, or other modalities. Output components 246 of server device 210, in one example, includes a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality.

UIC 212 of server device 210 may include display component 202 and presence-sensitive input component 204. Display component 202 may be a screen, such as any of the displays or systems described with respect to output components 246, at which information (e.g., a visual indication) is displayed by UIC 212 while presence-sensitive input component 204 may detect an object at and/or near display component 202.

While illustrated as an internal component of server device 210, UIC 212 may also represent an external component that shares a data path with server device 210 for transmitting and/or receiving input and output. For instance, in one example, UIC 212 represents a built-in component of server device 210 located within and physically connected to the external packaging of server device 210 (e.g., a screen on a mobile phone). In another example, UIC 212 represents an external component of server device 210 located outside and physically separated from the packaging or housing of server device 210 (e.g., a monitor, a projector, etc. that shares a wired and/or wireless data path with server device 210).

UIC 212 of server device 210 may detect two-dimensional and/or three-dimensional gestures as input from a user of server device 210. For instance, a sensor of UIC 212 may detect a user's movement (e.g., moving a hand, an arm, a pen, a stylus, a tactile object, etc.) within a threshold distance of the sensor of UIC 212. UIC 212 may determine a two or three-dimensional vector representation of the movement and correlate the vector representation to a gesture input (e.g., a hand-wave, a pinch, a clap, a pen stroke, etc.) that has multiple dimensions. In other words, UIC 212 can detect a multi-dimension gesture without requiring the user to gesture at or near a screen or surface at which UIC 212 outputs information for display. Instead, UIC 212 can detect a multi-dimensional gesture performed at or near a sensor which may or may not be located near the screen or surface at which UIC 212 outputs information for display.

In accordance with the techniques described herein, account module 220 may receive, from an employee computing device, employee information for a first employee of an employer. The employee information could include any information pertinent to a health insurance plan from any source, including, but not limited to, employment status (e.g., full-time, part-time, contract, etc.), employee age, employee gender, marital status, parental status, a number of dependents, age of the various dependent, a gender of the various dependent, dependent type (e.g., spouse, child, etc.), health information for the employee, dependent health information, a salary for the employee, and a wage for the employee. Account module 220 may store this information in rules data store 226.

Subsidy module 222 may determine, based on the employee information and employer subsidy information provided by the employer and stored in rules data store 226, an employer contribution to a first set of one or more healthcare plans for the first employee. The first set of one or more healthcare plans may be healthcare plans provided by the employer. In some instances, the employer may set explicit amounts based simply on the employee status and whether the employee has dependents or what dependents the employee has (i.e., spouse, children, or spouse and children). In other instances, different levels of employee may get different amounts, and the employer subsidy information may define those amounts. In still other instances, any combination of employee information could be plugged into a formula defined by the employer subsidy information to generate an employer contribution amount.

Subsidy module 222 may also determine, based on employee information, a secondary subsidy provided by a secondary entity through a secondary health insurance marketplace for a second set of one or more healthcare plans for the first employee. The secondary health insurance marketplace may be one or more of a state health insurance marketplace, a federal health insurance marketplace, or a secondary private marketplace. Similarly, the secondary subsidy may be any one or more of a state-granted subsidy, a federal-granted subsidy, or a private subsidy.

As subsidy module 222 may be part of (or remotely accessibly by) server device 210, a user may access all of this information through a portal application or other web application. As such, subsidy module 222 may determine the secondary subsidy without the employee computing device using a web browser navigate to any of a website for the secondary health insurance marketplace, a tool hosted by the secondary health insurance marketplace, a third-party tool used to estimate the secondary subsidy for the secondary health insurance marketplace, or a website hosted by any entity other than the server device. In other words, server device 210 may perform these actions separately from the user's web browser and without forcing the employee device to dedicate any processing power to the calculation or navigating to the webpages used to perform the calculations, thereby improving the efficiency and operability of the employee device.

In determining the secondary subsidy, subsidy module 222 may access a tool that calculates the secondary subsidy. If one were to navigate to this tool to use the tool themselves, this tool may require specific input in order to generate a secondary subsidy amount, with the input being directed by various fields. Subsidy module 222 may automatically populate one or more of the fields of the tool with corresponding portions of the employee information, thereby removing the requirement for a user to manually enter estimates into the tool. Subsidy module 222 may then execute the tool to generate the secondary subsidy. The tool may be hosted by the secondary health insurance marketplace, or may be hosted by another service that can accurately calculate these amounts. The tool may also, or alternatively, be a set of one or more webpages that perform an initial signup process for the first employee on the secondary health insurance marketplace.

Account module 220 may generate a graphical user interface that includes each of a graphical indication of the employer contribution and a graphical indication of the secondary subsidy. Account module 220 may generate these graphical indications in a same graphical user interface, providing an improved graphical user interface that provides each possibly subsidy available to an employee for an easy comparison. Account module 220 may then output, for display on a display device operatively connected to the employee computing device, the graphical user interface.

In some instances, the graphical user interface further includes each of a first selectable graphical indication to select the employer contribution and a second selectable graphical indication to select the secondary subsidy. In other words, the graphical user interface of the portal/web application may provide the users with a way to select which healthcare subsidy they wish to take advantage of and provide the users with a simple way to sign up for health insurance without fearing that the user accidentally declines healthcare and misses the free enrollment period.

In some examples, account module 220 may receive an indication of user input indicating a selection of the first selectable graphical indication, i.e., the employer contribution selection. Account module 220 may then generate a second graphical user interface that includes graphical indications of each of one or more of the first set of healthcare plans and, additionally or alternatively, the graphical indication of the employer contribution. In this way, after an easy comparison of the employer contribution and the secondary subsidy, the techniques of this disclosure may provide a method for selecting the employer contribution and completing the health insurance signup process.

In other examples, account module 220 may receive an indication of user input indicating a selection of the second selectable graphical indication, i.e., the secondary subsidy. In such examples, account module 220 may forward a web browser operating on the employee computing device to a webpage for the secondary health insurance marketplace. Account module 220 may also save an indication that the first employee has declined the first set of one or more healthcare plans provided by the employer, either in rules data store 226 or some other location. To further assist the user in signing up for health insurance through the secondary health insurance marketplace, account module 220 may pre-populate the webpage for the secondary health insurance marketplace with the employee information. In this way, after an easy comparison of the employer contribution and the secondary subsidy, the techniques of this disclosure may provide a method for selecting the secondary subsidy and completing the health insurance signup process through the secondary health insurance marketplace. Additionally, by taking the exact employee information from the employer portal application and calculating the secondary subsidy using the exact employee information, the employee receives an accurate value for the secondary subsidy to make an educated evaluation of the amounts when considering different health insurance plans.

Figure 3:
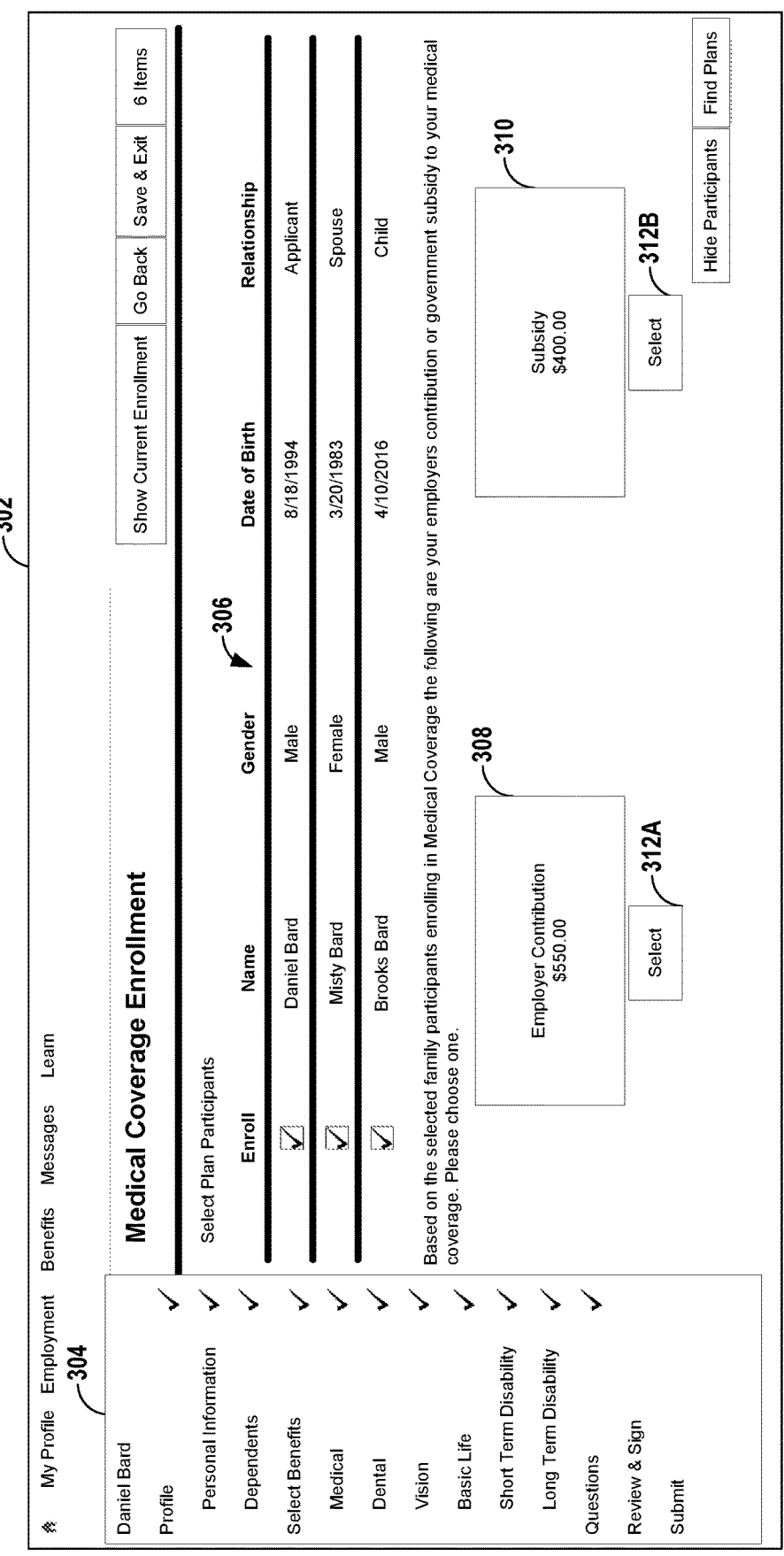
FIG. 3 is a conceptual diagram illustrating an example user interface produced by a server device that includes health insurance contribution amounts from multiple sources in a same user interface, in accordance with one or more of the techniques described herein.

FIG. 3 is a conceptual diagram illustrating an example user interface 302 produced by a server device (e.g., server device 110 of FIG. 1 or server device 210 of FIG. 2) that includes health insurance contribution amounts from multiple sources in a same user interface, in accordance with one or more of the techniques described herein. In the example of FIG. 3, in addition to having entered various personal information 304 and dependent information 306, the user is allowed to select which dependents are to be included in the plan calculation. User interface 302 shows depictions of both an employer contribution 308 and a secondary subsidy 310, each calculated by the server device using the techniques described herein using the employee information previously entered and the selection of the dependents. User interface 302 also includes elements 312A and 312B that allow the user to select one of the employer contribution or the secondary subsidy, respectively, after comparing the amounts included in user interface 302.

Figure 4:
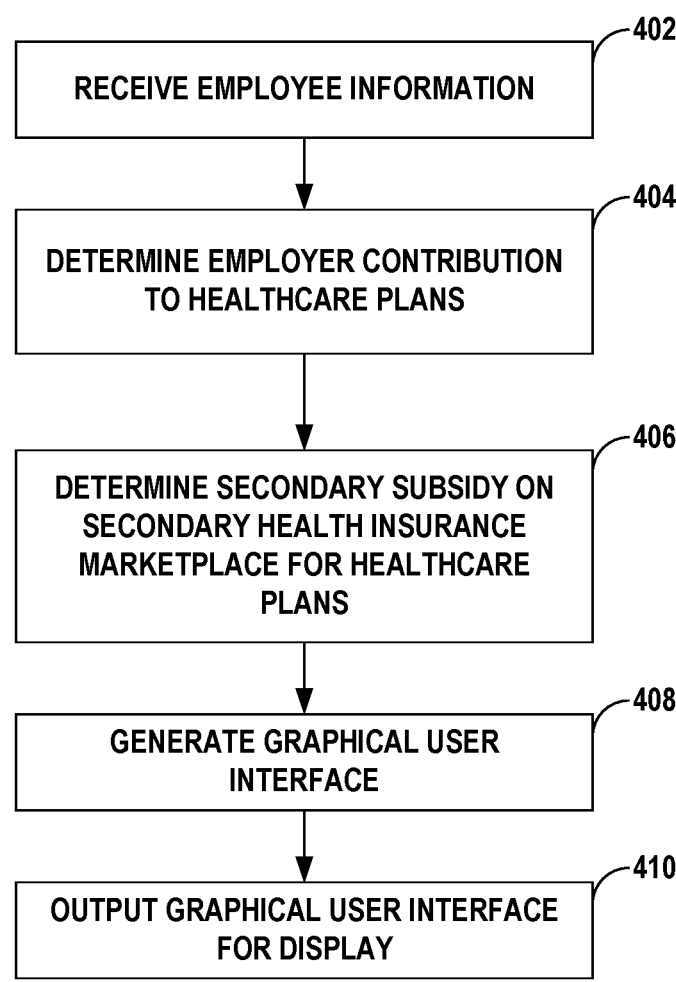
FIG. 4 is a flowchart illustrating an example technique described herein.

FIG. 4 is a flowchart illustrating an example technique described herein for generating a graphical user interface that includes both an employer contribution amount and a secondary subsidy amount. The techniques of FIG. 4 may be performed by one or more processors of a computing device, such as server 110 of FIG. 1 and/or server device 210 illustrated in FIG. 2. For purposes of illustration only, the techniques of FIG. 4 are described within the context of server device 210 of FIG. 2, although computing devices having configurations different than that of server device 210 may perform the techniques of FIG. 4.

In accordance with the techniques described herein, account module 220 receives, from an employee computing device, employee information for a first employee of an employer (402). Subsidy module 222 determines, based on the employee information and employer subsidy information provided by the employer, an employer contribution to a first set of one or more healthcare plans for the first employee (404), the first set of one or more healthcare plans being provided by the employer. Subsidy module 222 determines, based on the employee information, a secondary subsidy provided by a secondary entity through a secondary health insurance marketplace for a second set of one or more healthcare plans for the first employee (406). Account module 220 generates a graphical user interface that includes each of a graphical indication of the employer contribution and a graphical indication of the secondary subsidy (408). Account module 220 outputs, for display on a display device operatively connected to the employee computing device, the graphical user interface (410).

Figure 5:
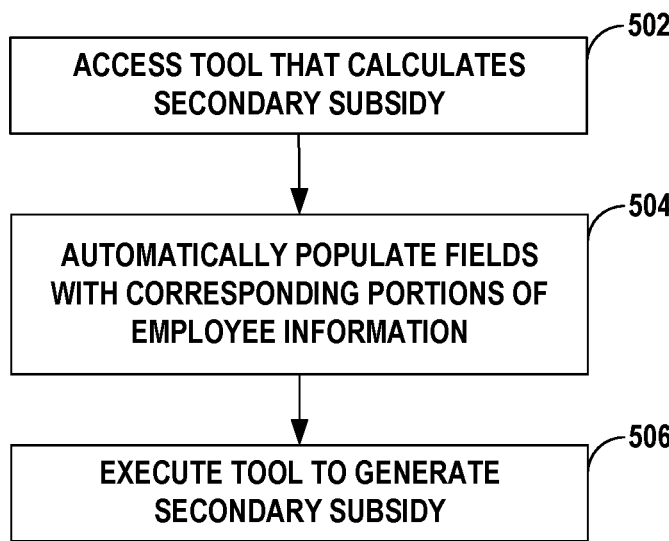
FIG. 5 is a flowchart illustrating an example technique described herein.

FIG. 5 is a flowchart illustrating an example technique described herein for calculating the secondary subsidy. The techniques of FIG. 5 may be performed by one or more processors of a computing device, such as server 110 of FIG. 1 and/or server device 210 illustrated in FIG. 2. For purposes of illustration only, the techniques of FIG. 5 are described within the context of server device 210 of FIG. 2, although computing devices having configurations different than that of server device 210 may perform the techniques of FIG. 5.

In accordance with the techniques described herein, subsidy module 222 accesses a tool that calculates the secondary subsidy (502). Subsidy module 222 automatically populates one or more fields of the tool with corresponding portions of the employee information (504). Subsidy module 222 executes the tool to generate the secondary subsidy (506).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and micro-wave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wire-less handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising:

receiving, by a server device and from an employee computing device, employee information for a first employee of an employer;

determining, by the server device, and based on the employee information and employer subsidy information provided by the employer, an employer contribution to a first set of one or more healthcare plans for the first employee, the first set of one or more healthcare plans being provided by the employer;

determining, by the server device, and based on the employee information, a secondary subsidy provided by a secondary entity through a secondary health insurance marketplace for a second set of one or more healthcare plans for the first employee;

generating, by the server device, a single web page within an employer portal that comprises a graphical user interface in which a graphical indication of the employer contribution and a graphical indication of the secondary subsidy are simultaneously presented in a same user interface, wherein the secondary subsidy is determined by the server device automatically populating fields of a subsidy-calculation tool of the secondary health insurance marketplace with the employee information and executing the tool, without requiring the employee computing device's web browser to navigate to any webpage other than said single web page; and outputting, by the server device, and for display on a display device operatively connected to the employee computing device, the single web page.

2. The method of claim 1, wherein the single web page further includes each of:

a first selectable graphical indication to select the employer contribution; and a second selectable graphical indication to select the secondary subsidy.

3. The method of claim 2, further comprising:

receiving, by the server device, an indication of user input indicating a selection of the first selectable graphical indication;

generating, by the server device, a second graphical user interface that includes graphical indications of each of one or more of the first set of healthcare plans and the graphical indication of the employer contribution.

4. The method of claim 2, further comprising:

receiving, by the server device, an indication of user input indicating a selection of the second selectable graphical indication; and forwarding, by the server device, a web browser operating on the employee computing device to a webpage for the secondary health insurance marketplace.

5. The method of claim 4, further comprising:

saving, by the server device, an indication that the first employee has declined the first set of one or more healthcare plans provided by the employer.

6. The method of claim 1, further comprising:

pre-populating, by the server device, the webpage for the secondary health insurance marketplace with the employee information.

7. The method of claim 1, wherein the employee information comprises one or more of:

employment status;

age;

gender;

marital status;

parental status;

dependent number;

dependent age;

dependent gender;

dependent type;

health information;

dependent health information;

salary; and wage.

8. The method of claim 1, wherein determining the secondary subsidy comprises:

accessing, by the server device, a tool that calculates the secondary subsidy;

automatically populating, by the server device, one or more fields of the tool with corresponding portions of the employee information; and executing, by the server device, the tool to generate the secondary subsidy.

9. The method of claim 8, wherein the tool is hosted by the secondary health insurance marketplace.

10. The method of claim 8, wherein the tool comprises a set of one or more webpages that perform an initial signup process for the first employee on the secondary health insurance marketplace.

11. The method of claim 1, wherein the secondary health insurance marketplace comprises one or more of a state health insurance marketplace, a federal health insurance marketplace, or a secondary private marketplace.

12. The method of claim 1, wherein the secondary subsidy comprises one or more of a state-granted subsidy, a federal-granted subsidy, or a private subsidy.

13. The method of any claim 1, wherein determining the secondary subsidy comprises determining, by the server device, the secondary subsidy without the employee computing device using a web browser navigate to any of:

a website for the secondary health insurance marketplace;

a tool hosted by the secondary health insurance marketplace;

a third-party tool used to estimate the secondary subsidy for the secondary health insurance marketplace; or a website hosted by any entity other than the server device.

14. A server device comprising:

one or more communication units; and one or more processors, wherein the one or more processors are configured to:

receive, from an employee computing device, employee information for a first employee of an employer;

determine, based on the employee information and employer subsidy information provided by the employer, an employer contribution to a first set of one or more healthcare plans for the first employee, the first set of one or more healthcare plans being provided by the employer;

determine, based on the employee information, a secondary subsidy provided by a secondary entity through a secondary health insurance marketplace for a second set of one or more healthcare plans for the first employee;

generate a single web page within an employer portal that comprises a graphical user interface in which a graphical indication of the employer contribution and a graphical indication of the secondary subsidy are simultaneously presented in a same user interface, wherein the secondary subsidy is determined by the server device automatically populating fields of a subsidy-calculation tool of the secondary health insurance marketplace with the employee information and executing the tool, without requiring the employee computing device's web browser to navigate to any webpage other than said single web page; and output, for display on a display device operatively connected to the employee computing device, the single web page.

15. The server device of claim 14, wherein the one or more processors being configured to determine the secondary subsidy comprises the one or more processors being configured to:

access a tool that calculates the secondary subsidy;

automatically populate one or more fields of the tool with corresponding portions of the employee information; and execute the tool to generate the secondary subsidy.

16. A non-transitory computer-readable storage medium containing instructions that, when executed, cause one or more processors of a server device to:

receive, from an employee computing device, employee information for a first employee of an employer;

determine, based on the employee information and employer subsidy information provided by the employer, an employer contribution to a first set of one or more healthcare plans for the first employee, the first set of one or more healthcare plans being provided by the employer;

determine, based on the employee information, a secondary subsidy provided by a secondary entity through a secondary health insurance marketplace for a second set of one or more healthcare plans for the first employee;

generate a single web page within an employer portal that comprises a graphical user interface in which a graphical indication of the employer contribution and a graphical indication of the secondary subsidy are simultaneously presented in a same user interface, wherein the secondary subsidy is determined by the server device automatically populating fields of a subsidy-calculation tool of the secondary health insurance marketplace with the employee information and executing the tool, without requiring the employee computing device's web browser to navigate to any webpage other than said single web page; and output, for display on a display device operatively connected to the employee computing device, the single web page.

17. The non-transitory computer-readable storage medium of claim 16, wherein the instructions that, when executed, cause the one or more processors of the server device to determine the secondary subsidy comprise instructions that, when executed, cause the one or more processors to:

access a tool that calculates the secondary subsidy;

automatically populate one or more fields of the tool with corresponding portions of the employee information; and execute the tool to generate the secondary subsidy.

18. The non-transitory computer-readable storage medium of claim 16, wherein the single web page further includes each of:

a first selectable graphical indication to select the employer contribution; and a second selectable graphical indication to select the secondary subsidy.

19. The non-transitory computer-readable storage medium of claim 18, wherein the instructions, when executed, further cause the one or more processors of the server device to:

receiving, by the server device, an indication of user input indicating a selection of the first selectable graphical indication;

generating, by the server device, a second graphical user interface that includes graphical indications of each of one or more of the first set of healthcare plans and the graphical indication of the employer contribution.

20. The non-transitory computer-readable storage medium of claim 18, wherein the instructions, when executed, further cause the one or more processors of the server device to:

receiving, by the server device, an indication of user input indicating a selection of the second selectable graphical indication;

forwarding, by the server device, a web browser operating on the employee computing device to a webpage for the secondary health insurance marketplace; and saving, by the server device, an indication that the first employee has declined the first set of one or more healthcare plans provided by the employer.

* * * * *